United States Patent
Seiler et al.

(10) Patent No.: US 12,265,479 B2
(45) Date of Patent: Apr. 1, 2025

(54) ELECTRONIC DEVICE FOR REMOTE ACCESS TO A COMPUTER

(71) Applicant: Hewlett-Packard Development Company, L.P., Spring, TX (US)

(72) Inventors: Peter Andrew Seiler, Fort Collins, CO (US); Byron A. Alcorn, Fort Collins, CO (US); Clifton Robin, Fort Collins, CO (US); John Michael Stahl, Fort Collins, CO (US); Patrick S. Anderson, Fort Collins, CO (US); Eric John Gressman, Fort Collins, CO (US); Douglas Allen Reynolds, Fort Collins, CO (US); Joseph-Jonathan Salzano, Fort Collins, CO (US); Gregory Mark Hughes, Fort Collins, CO (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 18/564,417

(22) PCT Filed: Jun. 30, 2021

(86) PCT No.: PCT/US2021/039805
§ 371 (c)(1),
(2) Date: Nov. 27, 2023

(87) PCT Pub. No.: WO2023/277895
PCT Pub. Date: Jan. 5, 2023

(65) Prior Publication Data
US 2024/0248857 A1     Jul. 25, 2024

(51) Int. Cl.
*G06F 13/10*       (2006.01)
(52) U.S. Cl.
CPC .......... *G06F 13/10* (2013.01); *G06F 2213/40* (2013.01)
(58) Field of Classification Search
CPC ............................ G06F 13/10; G06F 2213/40
See application file for complete search history.

(56) References Cited

U.S. PATENT DOCUMENTS

| | | | |
|---|---|---|---|
| 5,402,014 A | 3/1995 | Ziklik et al. | |
| 7,818,480 B2* | 10/2010 | Hoerl | H04L 67/125 345/158 |
| 9,148,147 B2 | 9/2015 | Hematy et al. | |
| 11,327,521 B1* | 5/2022 | Lei | G06F 3/04897 |
| 2011/0208963 A1 | 8/2011 | Soffer | |
| 2013/0050084 A1 | 2/2013 | Soffer | |

(Continued)

FOREIGN PATENT DOCUMENTS

EP     3385855 A1    10/2018

*Primary Examiner* — Zachary K Huson
(74) *Attorney, Agent, or Firm* — Knobbe, Martens, Olson & Bear, LLP

(57) ABSTRACT

In some examples, an electronic device includes a network interface to connect to a computer network, a display port operating as a display input, an input/output port, memory having a plurality of profiles, and a processor coupled to the memory. In some examples, the processor is to change an operation of the input/output port based on a profile of the plurality of profiles. In some examples, the processor is to change the display port from the display input to a display output based on the profile of the plurality of profiles.

15 Claims, 6 Drawing Sheets

(56) References Cited

U.S. PATENT DOCUMENTS

2016/0203343 A1\* 7/2016 Soffer ................. G06F 13/4068
726/34
2018/0375268 A1\* 12/2018 Chapel ................. H01R 25/006
2020/0019417 A1\* 1/2020 Puthillathe .............. G06F 9/452

\* cited by examiner

ELECTRONIC DEVICE FOR REMOTE ACCESS TO A COMPUTER

BACKGROUND

The use of electronic devices has expanded. Some electronic devices include electronic circuitry for performing processing. As processing capabilities have expanded, electronic devices have been utilized to perform more functions. For example, a variety of electronic devices are used for work, communication, and entertainment. Electronic devices may be linked to other devices and may communicate with other devices.

DETAILED DESCRIPTION

A Keyboard, Video, and Mouse (KVM) device or switch may be an electronic device to facilitate the capture of video protocols and remoting them to a remote console for viewing. A KVM may also facilitate the use of Universal Serial Bus (USB), Personal System/2 (PS/2), or other serial protocols to emulate devices such as mice or keyboards to remotely control computing devices. An Internet Protocol (IP) KVM is a KVM that may be used over an IP computer network.

In the Figures herein, examples of an IP KVM are described that may change roles, update features mid-life, and evolve with changing customer needs by providing program instructions to change the operation of the IP KVM. In some examples, functions of an IP KVM may be changed through hardware changes. In examples shown below, functions of an IP KVM may be made through changes to program instructions executed on the device.

Figure 1:
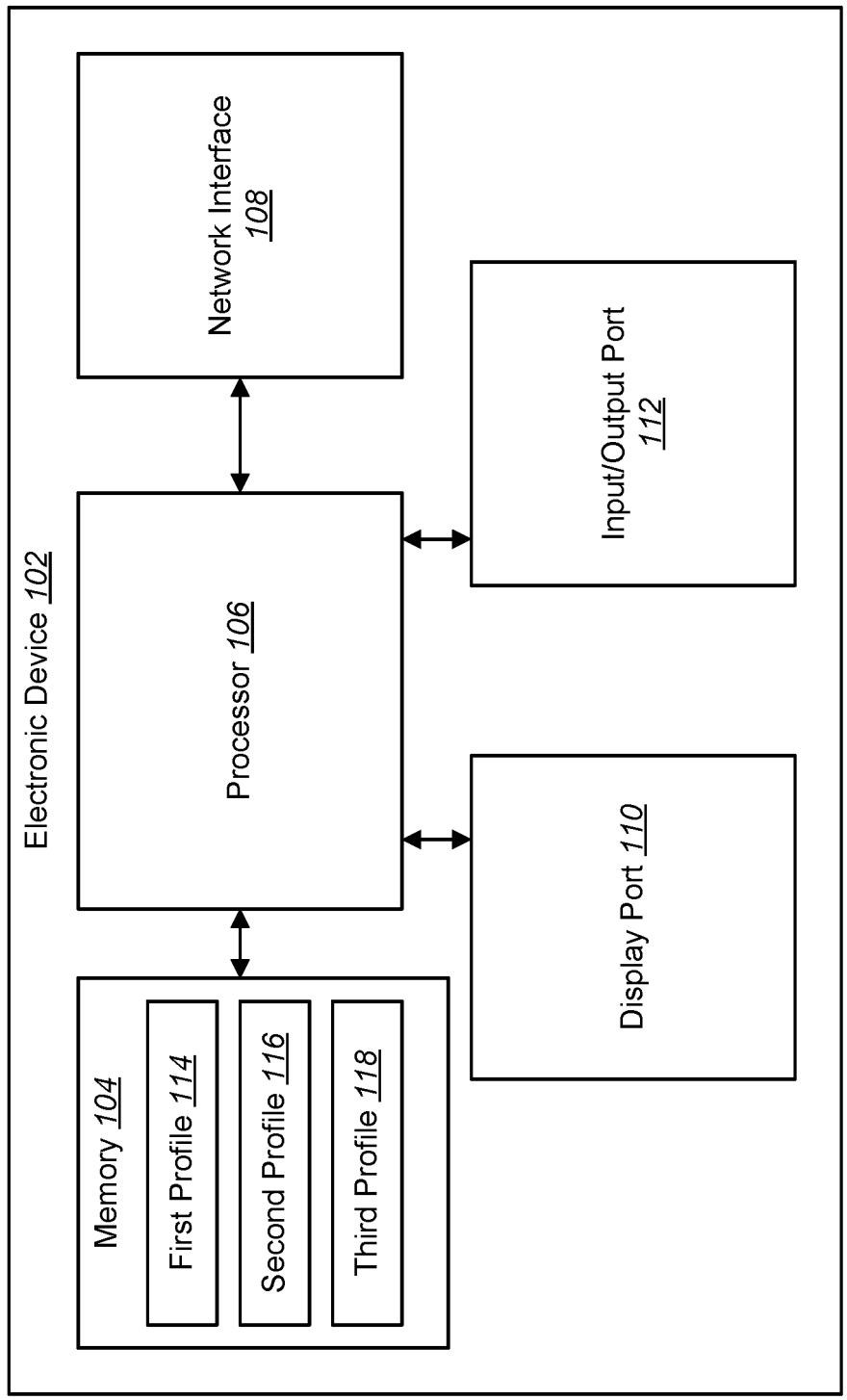
FIG. 1 is a block diagram illustrating an example of an electronic device that may be used to provide remote access to a computer.

FIG. 1 is a block diagram illustrating an example of an electronic device 102 that may be used to provide remote access to a computer. In some examples, the electronic device 102 may include or may be coupled to a processor 106 in communication with memory 104. The electronic device 102 may include a network interface 108 to communicate over a computer network with computers or computing devices.

In some examples, portions of the electronic device 102 may be coupled via an interface (e.g., bus(es), wire(s), connector(s), etc.). For example, portions of the electronic device 102 or circuitries of the electronic device 102 may be coupled via an inter-integrated circuit (I2C) interface. The portions or circuitries may communicate via the interface.

The electronic device 102 may include additional portions (e.g., components, circuitries, etc.) (not shown) or some of the portions described herein may be removed or modified without departing from the scope of this disclosure. In some examples, the electronic device 102 may include input/output (I/O) circuitry (e.g., port(s), interface circuitry, etc.), memory circuitry, input device(s), output device(s), etc., or a combination thereof. Examples of output devices include a display panel(s), speaker(s), headphone(s), etc. Examples of input devices include a keyboard, a mouse, a touch screen, camera, microphone, etc. In some examples, a user may input instructions or data into the electronic device 102 using an input device or devices.

In some examples, the memory 104 may include memory circuitry. The memory circuitry may be electronic, magnetic, optical, or other physical storage device(s) that contains or stores electronic information (e.g., instructions, data, or a combination thereof). In some examples, the memory circuitry may store instructions for execution (by the processor 106 or other component(s) of the electronic device 102, or a combination thereof). The memory circuitry may be integrated into or separate from the element(s) described in FIG. 1. The memory circuitry may be, for example, Random Access Memory (RAM), Electrically Erasable Programmable Read-Only Memory (EEPROM), storage device(s), optical disc(s), or the like. In some examples, the memory circuitry may be volatile memory, non-volatile memory, or a combination thereof. Examples of memory circuitry may include Dynamic Random Access Memory (DRAM), EEPROM, magnetoresistive random-access memory (MRAM), phase change RAM (PCRAM), memristor, flash memory, or the like. In some examples, the memory circuitry may be non-transitory tangible machine-readable or computer-readable storage media, where the term "non-transitory" does not encompass transitory propagating signals.

The processor 106 may be any of a general-purpose processor, central processing unit (CPU), a digital signal processor (DSP), a semiconductor-based microprocessor, a system-on-chip (SoC), graphics processing unit (GPU), field-programmable gate array (FPGA), an application-specific integrated circuit (ASIC), and/or other hardware device suitable for retrieval and execution of instructions stored in the memory 104. The processor 106 may fetch, decode, and/or execute instructions stored in the memory 104. In some examples, the processor 106 may include an electronic circuit or circuits that include electronic components for performing a function or functions of the instructions. In some examples, the processor 106 may perform one, some, or all of the operations, aspects, etc., described in connection with one, some, or all of FIGS. 1-6. For example, the memory 104 may store instructions for one, some, or all of the operations, aspects, etc., described in relation to one, some, or all of FIGS. 1-6.

The electronic device 102 may include a display port 110 to connect to a monitor or to connect to a display port on a computing device. In some examples, the display port 110 may be a Universal Serial Bus (USB) interface, a DisplayPort interface, a High-Definition Multimedia Interface (HDMI), a Video Graphics Array (VGA) interface, a Digital Visual Interface (DVI), etc. Other technologies may be used to implement the display port 110.

The electronic device 102 may include an input/output port 112 to connect to an input device, an output device, or to connect to an input port or output port on a computing device. In some examples, the input/output port 112 may be a Universal Serial Bus (USB) interface, a Personal System/2

(PS/2) port, a serial port, a parallel port, a Firewire port, a Lightning® port, etc. Other technologies may be used to implement the input/output port 112.

The memory 104 may include a first profile 114. In some examples, the first profile 114 includes instructions or settings for the processor 106 to program or set the display port 110 and the input/output port 112. In some examples, a first profile 114 may indicate that the display port 110 should be used as a display output to be connected to an external monitor. In another example, a second profile 116 may indicate that the display port 110 should be used as a display input to be connected to the display output on a computer. In some examples, a first profile 114 may indicate that the input/output port 112 should be used as an input port to be connected to an input device. In another example, the second profile 116 may indicate that the input/output port 112 is to be used as an output to be connected to a port on a computer.

The first profile 114 may include the setting or instructions to define the role, functions, command, control and other programmable features of the electronic device 102. Hardware or program elements in the device that may have operational changes based on the instructions or settings of the device may be controlled through settings or instructions in the first profile 114.

The memory 104 may also include a second profile 116 and a third profile 118 having other settings for different roles that the electronic device 102 may be programmed to execute. The second profile 116 and the third profile 118 may be examples or profiles as described for the first profile 114. Additional profiles may also be stored in the memory 104.

In some examples, the processor 106 may change an operation of the input/output port 112 based on a profile of the plurality of profiles. The processor 106 may also change the display port 110 from a display input to a display output based on the profile of the plurality of profiles. In one example, assume that the electronic device 102 may be in first role based on the first profile 114 where the display port 110 is being used as a display output and where the input/output port 112 is being used as an input. The processor 106 may read the second profile 116 from the memory 104 and execute or load the second profile 116 to change the electronic device 102 to operate in a second role based on the second profile 116 where the display port 110 is being used as a display input and where the input/output port 112 is being used as an output.

Figure 2:
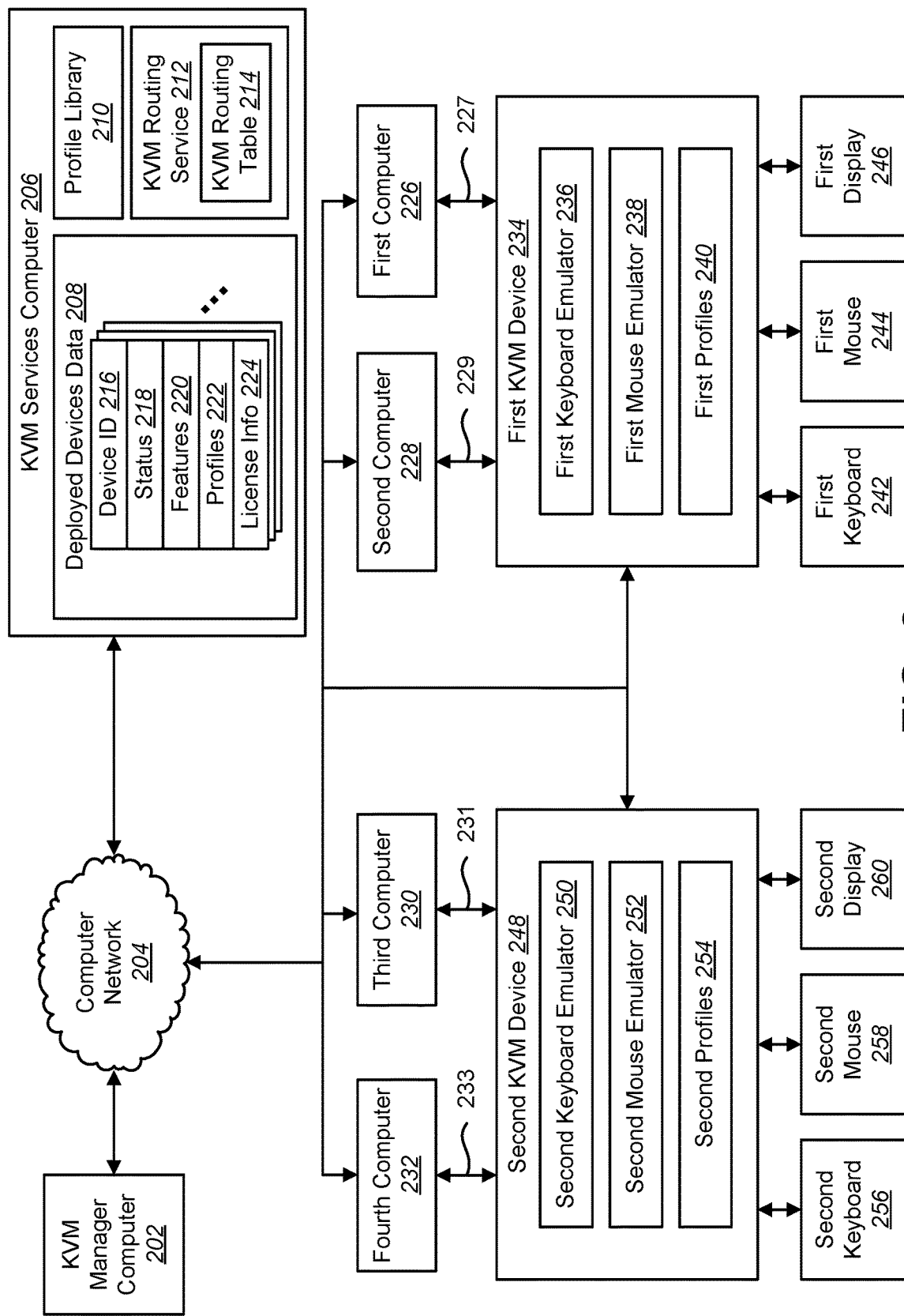
FIG. 2 is a block diagram illustrating an example of multiple electronic devices that may provide remote access to multiple computers.

FIG. 2 is a block diagram of an example of multiple electronic devices that may provide remote access to multiple computers. In some examples, the electronic devices may be Keyboard, Video, and Mouse (KVM) devices. The KVM devices may be Internet Protocol (IP) KVM devices. The KVM devices shown in FIG. 2 may be examples of the electronic device 102 of FIG. 1.

The first KVM device 234 may be in electronic communication with peripheral devices. For example, the first KVM device 234 may be in electronic communication with a first keyboard 242, a first mouse 244, and a first display 246. The first keyboard 242 may be used by a user to enter keyboard input into the first KVM device 234. The first mouse 244 may be used by the user to enter mouse input into the first KVM device 234. The first display 246 or monitor may be used to display information to the user from the first KVM device 234.

The first KVM device 234 may be in electronic communication with a computer or computing device. Examples of computers may include computing devices, server computers, desktop computers, laptop computers, etc. In some examples, the first KVM device 234 may be in electronic communication with a first computer 226 via first computer connections 227. The first computer connections 227 may include a display port connection, an input/output port connection, and other electronic connections that the first computer 226 may have. The first KVM 234 may also be in electronic communication with a second computer 228 via second computer connections 229. The second computer connections 229 may be similar to the first computer connections 227.

In some examples the first KVM 234 may include three display ports, one for the first display 246, one for the first computer 226, and one for the second computer 228. The first KVM 234 may include three sets of input/output ports, one set for the first computer 226, one set for the second computer 228 and one set for local peripheral devices, such as the first keyboard 242 and first mouse 244. A set of input/output ports may include two input/output ports where one input/output port may be for a keyboard and one input/output port may be for a mouse. In another example, the first KVM 234 may include one display port and one input/output port. Depending on the hardware of the KVM device, the number of ports may vary.

The first KVM device 234 may have a plurality of profiles 240 stored on the first KVM 234. The first profiles 240 may be examples of the profiles described in FIG. 1. The different profiles 240 on the first KVM 234 may cause the first KVM 234 to change the role the first KVM 234 is operating in when a new or different profile 240 is executed or loaded by the first KVM 234. Further examples are described herein. A profile is loaded or executed when the device reads in the profile and processes the profile by making changes to the device as indicated by the profile. In some examples, the profile may be data having setting information for the ports of the device. In other examples, the profile may include program instructions that may be executed by the processor 106.

The first KVM device 234 may include a first keyboard emulator 236. The first keyboard emulator 236 may include instructions to receive keyboard input data from the computer network 204 and send the keyboard input data to the first computer 226 or the second computer 228 by emulating keyboard input such that the first computer 226 or the second computer 228 receives the keyboard input in a similar manner as when keyboard input is received by the computer connected directly to a keyboard. In some examples, a user who is using a remote keyboard may enter input at a remote location, and by having the keyboard input data sent to the first keyboard emulator 236, the first KVM 234 may be able to send the keyboard input from the remote user to the first computer 226 as if the remote user is connected directly to the first computer 226.

The first KVM device 234 may include a first mouse emulator 238. The first mouse emulator 238 may include instructions to receive mouse input data via the computer network 204 and send the mouse input data to the first computer 226 or the second computer 228 by emulating mouse input such that the first computer 226 or the second computer 228 receives the mouse input in a similar manner as when mouse input is received by the computer connected directly to a mouse. In some examples, a user who is using a remote mouse may enter input at a remote location and by having the mouse input data sent to the first mouse emulator 238 the first KVM 234 may be able to send the mouse input from the remote user to the first computer 226 as if the remote user is connected directly to the first computer 226.

A second KVM 248 may be in electronic communication with a second keyboard 256, a second mouse 258, and a second display 260. The second KVM 248 may be in electronic communication with a third computer 230 via a third computer connection 231. The second KVM 248 may be in electronic communication with a fourth computer 232 via a fourth computer connection 233. The second KVM 248 may include a second keyboard emulator 250 and a second mouse emulator 252. The second KVM 248 may also include a plurality of profiles, referred to as the second profiles 254.

The first KVM 234 may be an electronic communication with the second KVM 248 through a computer network 204. The first computer 226, second computer 228, third computer 230, and fourth computer 232 may be in electronic communication with the computer network 204.

The computer network 204 may be a wireless or wired communication network. Examples of the computer network 204 may include a local area network (LAN), wide area network (WAN), the Internet, cellular network, Long Term Evolution (LTE) network, 5G network, and/or combinations thereof, etc. In some examples, the devices may be on the same local network, on separate local networks, connected through the Internet, and/or combinations thereof.

By way of example, a first KVM 234 may load a profile from the first profiles 240 for the first KVM 234 to be in the role of a receiver or remote receiver. The second KVM 248 may load a profile from the second profiles 254 for the second KVM 248 to be in the role of a sender or a remote sender. A user located at the first KVM 234 may access the third computer 230 through the first KVM 234 acting as a receiver and through the second KVM 248 acting as a sender. When a user enters input through the first keyboard 242 or the first mouse 244, the first KVM 234 may receive this as user input and send this user input to the second KVM 248. The first KVM 234 may packetize the user input information before it is sent to the second KVM 248. The second KVM 248 may receive this user input and may use the second keyboard emulator 250 and the second mouse emulator 252 to provide the user input to the third computer 230. Display output from the third computer 230 may be provided to the second KVM 248 through a display port 110. The second KVM 248 may receive this display output and send it to the first KVM 234. The second KVM 248 may encode a graphics stream associated with the display output. The first KVM 234 may receive this display output and send it to the connected first display 246 through a display port 110 for display to the user.

In another example, the first KVM 234 may be programmed to act as a sender and the second KVM 248 may be programmed to act as the receiver. A sender may also be referred to as a remote sender, and a receiver may also be referred to as a remote receiver. The first KVM device 234 may load a profile for the first KVM 234 to be in the role of a sender. The second KVM 248 may load a profile for the second KVM 248 to be in the role of a receiver. A second user located at the second KVM 248 may access the first computer 226 through the first KVM 234 acting as a sender and through the second KVM 248 acting as a receiver. When the second user enters input through the second keyboard 256 or the second mouse 258 the second KVM 248 may receive this as user input and send this user input to the first KVM 234. The first KVM 234 may receive this user input and may use the first keyboard emulator 236 and the first mouse emulator 238 to provide the user input to the first computer 226. Display output from the first computer 226 may be provided to the first KVM 234 through a display port 110. The first KVM 234 may receive this display output and send it to the second KVM 248. The second KVM 248 may receive this display output and send it to the connected display 260 through a display port 110 for display to the second user.

As described herein, the first KVM 234 and the second KVM 248 may change roles and operation based on the profile that is being executed or loaded. The various ports and interfaces of the KVM devices may be changed based on the profile being used.

A KVM services computer 206 may be an electronic communication with the first KVM device 234 (or first KVM 234) and the second KVM device 248 (or second KVM 248) via the computer network 204. The KVM services computer 206 may be in electronic communication with other KVM devices. The KVM services computer 206 may provide deployment services, profile services, and KVM routing services 212.

The KVM services computer 206 may store information relating to KVM devices deployed. In some examples, the KVM deployed devices data 208 may store a record for KVM devices. A KVM device record may include a device identification 216, a status 218, feature information 220, profile information 222 and licensing information 224. The device identification 216 may be an identification for the particular KVM device. The status 218 may include information about the health or other status 218 of the device. The feature information 220 may include hardware and/or program features of the specific device. In one example, the feature information 220 may indicate how many display ports 110 the device has or how many input/output ports 112 the device has along with the specifications for each port. The profile information 222 may include information about what profiles 222 the particular device has stored on the device. The licensing information 224 may include the status 218 of a license for the profiles 222, the device, or other instructions loaded onto the device. The licensing information 224 may validate licenses, indicate authorization to download and use certain profiles 222 or features 220.

The KVM services computer 206 may include a profile library 210 to be used in providing profile services. In one example, a profile service may be providing profiles that may be downloaded from the KVM services computer 206 and loaded onto KVM devices. The profile library 210 may include a plurality of profiles that may be used by KVM devices. A profile may include a profile identification, settings for the ports for a particular profile, and executable instructions for the profile. An example of a profiles library is shown in FIG. 3.

The KVM services computer 206 may include a KVM routing table 214 to provide KVM routing services 212. In some examples, a first KVM 234 may use or access the KVM routing table 214 in order to send information to the second KVM 248. Different KVM devices on computer networks 204 may use the KVM routing table 214 to send information to other KVM devices on other computer networks 204.

A KVM manager computer 202 may be in electronic communication with the computer network 204 to manage KVM devices. In some examples, the KVM manager computer 202 may communicate with the first KVM device 234 and the second KVM device 248. When the KVM manager computer 202 is to provide a new role to a KVM device, the KVM manager computer 202 may access the profile library 210 from the KVM services computer 206 and may download a new profile for the new role and send it to the KVM device. The KVM manager may also check deployment information, feature information 220, or other information from the KVM services computer 206 to manage the KVM devices.

Figure 3:
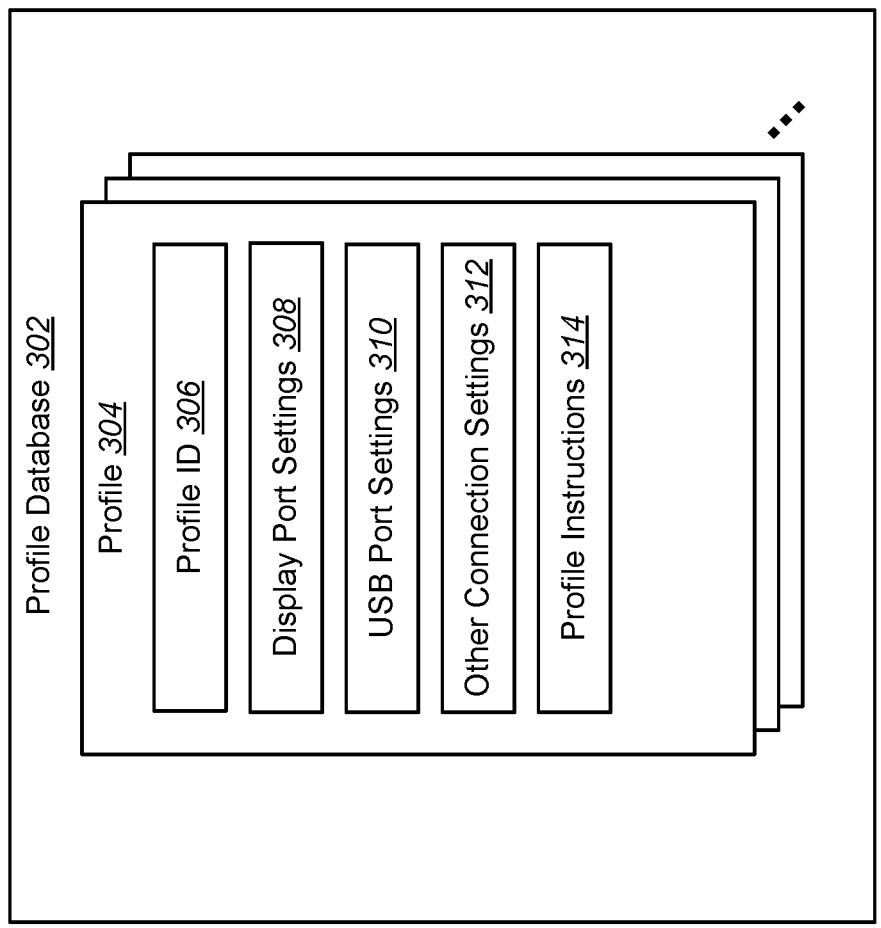
FIG. 3 is a block diagram illustrating an example of a profile library that may be used to provide remote access to a computer.

FIG. 3 is a block diagram of an example of a profile database 302 that may be used to provide remote access to multiple computers. A profile database 302 is an example of the profile library 210 described in FIG. 2. The profile database 302 may include a plurality of profiles 304 that may be used by KVM devices. A profile 304 may include a profile identification 306, display port settings 308, USB port settings 310, other connection settings 312, and profile instructions 314. The profile identification 306 is an identification for the profile 304. For example, the profile identification 306 may indicate it is a receiver profile, a sender profile, an administrator profile, a general user profile, etc. In some examples, the profile 304 may be an administrator profile. For example, an administrator profile may have settings or instructions to have full control of the host and access, while a general user profile may allow control of certain functions, or limited access.

The display port settings 308 are settings for the display port 110. In one example, the display port settings 308 may indicate whether the display port 110 is operating as an input display port or as an output display port. In addition, the display port settings 308 may include CODECs (e.g., new or different CODECs), resolution settings, and refresh rates. By changing the display port settings 308, any of the various settings may be changed.

The USB port settings 310 may indicate whether the USB port is being used as an input, as an output, and the specific device connected to the USB port. The USB port settings 310 may also include adding other I/O support such as pen and touch interfaces, audio interfaces, storage device interfaces, etc.

There may be other connection settings 312 in the profile 304 for other ports or connections of the device. Profile instructions 314 may include executable instructions for the KVM device to accomplish the particular role defined by the profile 304. The profile instructions 314 may be instructions executable by the processor 106.

Instructions may be code and/or programming that specifies functionality or operation of the circuitry. In some examples, instructions may be stored in memory (e.g., Read-Only Memory (ROM), Erasable Programmable Read-Only Memory (EPROM), Electrically Erasable Programmable Read-Only Memory (EEPROM), flash memory, dynamic random access memory (DRAM), synchronous DRAM (SDRAM), magnetoresistive random-access memory (MRAM), phase-change random-access memory (PCRAM), hard disk drive (HDD), solid state drive (SSD), optical drive, etc.). In some examples, different circuitries in an electronic device 102 may store and/or utilize separate instructions for operation.

Figure 4:
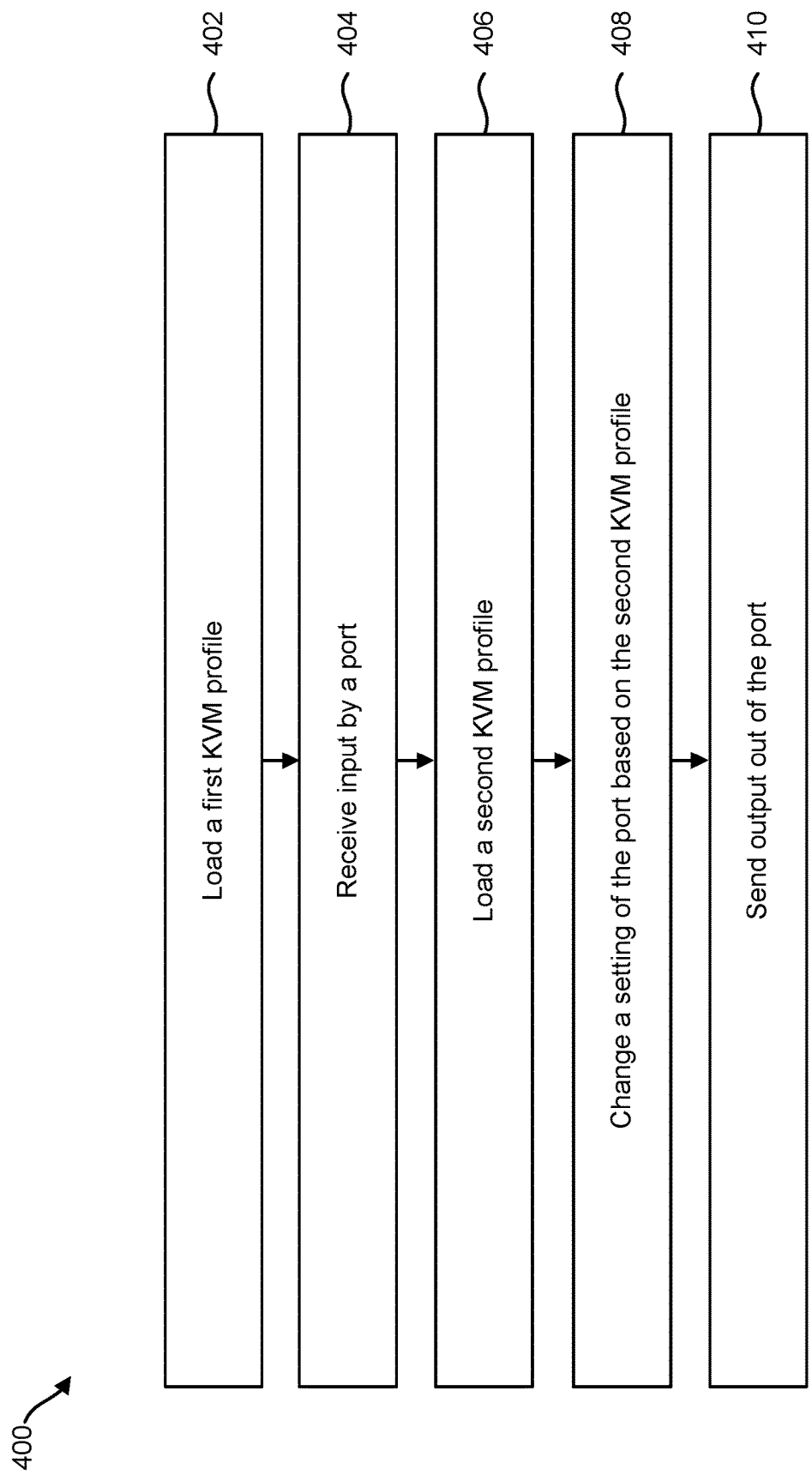
FIG. 4 is a flow diagram illustrating an example of a method for providing remote access to a computer.

FIG. 4 is a flow diagram illustrating an example of a method 400 for providing remote access to a computer. The method 400 and/or a method 400 element(s) may be performed by an electronic device 102. At 402, a first KVM profile is loaded. At 404, input may be received by a port. At 406, a second KVM profile is loaded. At 408, a setting of the port may be changed based on the second KVM profile. At 410, output may be sent out of the port.

Figure 5:
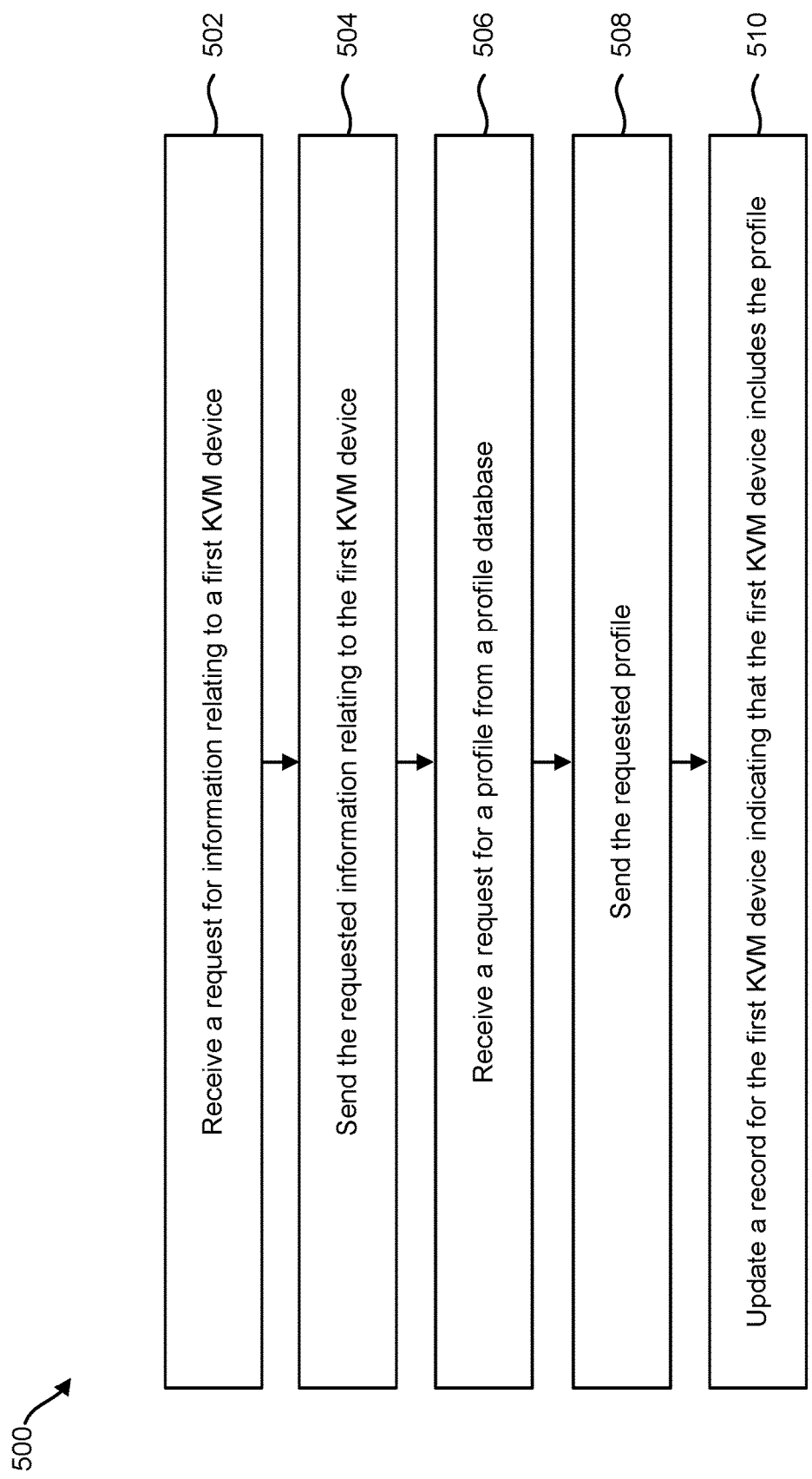
FIG. 5 is a flow diagram illustrating an example of a method for providing remote access to a computer.

FIG. 5 is a flow diagram illustrating an example of a method 500 for providing remote access to a computer. The method 500 and/or a method 500 element(s) may be performed by a KVM services computer 206 as illustrated in FIG. 2. At 502, a request for information relating to a first KVM device 234 is received. At 504, the requested information relating to the first KVM device 234 is sent. At 506, a request for a profile from a profile database 302 is received. At 508, the requested profile is sent. At 510, the method updates a record for the first KVM device 234 indicating that the first KVM 234 device includes the profile.

Figure 6:
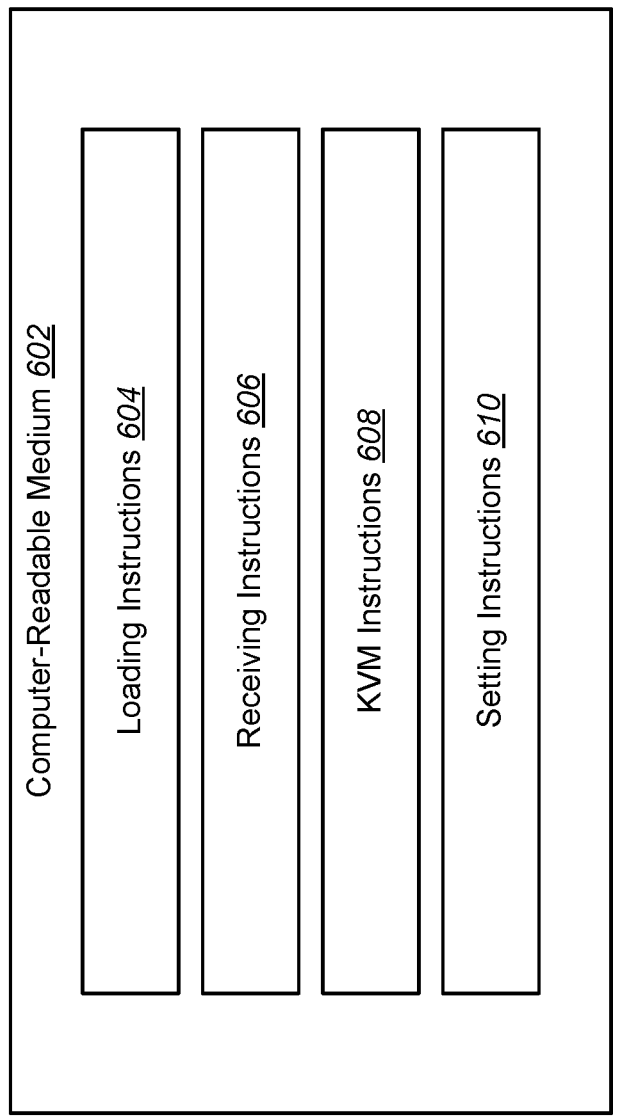
FIG. 6 is a block diagram illustrating an example of a computer-readable medium for providing remote access to a computer.

FIG. 6 is a block diagram illustrating an example of a computer-readable medium 602 for providing remote access to a computer. The computer-readable medium 602 may be a non-transitory, tangible computer-readable medium. The computer-readable medium 602 may be, for example, RAM, EEPROM, a storage device, an optical disc, and/or the like. In some examples, the computer-readable medium 602 may be volatile and/or non-volatile memory, such as DRAM, EEPROM, MRAM, PCRAM, memristor, flash memory, and/or the like. In some examples, the computer-readable medium 602 may be included in a computing device, an electronic device 102 and/or may be accessible to a processor 106 of a computing device or electronic device 102. In some examples, the computer-readable medium 602 may be an example of the memory 104 described or mentioned in relation the Figures herein.

The computer-readable medium 602 may include code (e.g., data, executable instructions, and/or executable code). For example, the computer-readable medium 602 may include loading instructions 604, receiving instructions 606, KVM instructions 608, and setting instructions 610. The loading instructions 604 may be instructions that when executed cause the processor 106 to load a profile. The receiving instructions 606 may be instructions that when executed cause the processor 106 to receive a new profile from a network interface 108 and to store the new profile into memory 104. The KVM instructions 608 may be instructions that when executed cause the processor 106 to operate as a KVM device. The setting instructions 610 may be instructions that when executed cause a processor 106 to change a setting for a port on a KVM device.

A technique or techniques, a method or methods (e.g., method(s) 400 and/or 500) and/or an operation or operations described herein may be performed by (and/or on) an electronic device and/or a computing device. In some examples, an electronic device and/or a computing device may include circuitry (e.g., a processor 106 with instructions and/or connection interface circuitry) to perform a technique or techniques described herein.

As used herein, the term "and/or" may mean an item or items. For example, the phrase "A, B, and/or C" may mean any of: A (without B and C), B (without A and C), C (without A and B), A and B (but not C), B and C (but not A), and C (but not B), or all of A, B, and C.

While various examples are described herein, the disclosure is not limited to the examples. Variations of the examples described herein may be within the scope of the disclosure. For example, aspects or elements of the examples described herein may be omitted or combined.

The invention claimed is:

1. An electronic device, comprising:
a network interface to connect to a computer network;
a display port, wherein the display port operates as a display input;
an input/output port;
memory comprising a plurality of profiles;
a processor coupled to the memory, wherein the processor is to:
change an operation of the input/output port based on a profile of the plurality of profiles; and change the display port from the display input to a display output based on the profile of the plurality of profiles.

2. The electronic device of claim 1, wherein the operation change of the input/output port comprises changing the input/output port from an output to an input.

3. The electronic device of claim 2, wherein the processor is further to receive keyboard input via the input/output port and to send the keyboard input using the network interface.

4. The electronic device of claim 1, wherein the plurality of profiles comprises a first profile to cause the electronic device to be a remote sender.

5. The electronic device of claim 4, wherein the plurality of profiles comprises a second profile to cause the electronic device to be a remote receiver.

6. The electronic device of claim 1, wherein the electronic device comprises a keyboard, video and mouse device.

7. The electronic device of claim 1, wherein the processor is further to change a display output setting.

8. The electronic device of claim 1, wherein the processor is further to load the profile before the operation change.

9. A method, comprising:
   loading a first keyboard, video and mouse (KVM) profile;
   receiving input on a first port;
   loading a second KVM profile;
   changing a setting of the first port based on the second KVM profile; and
   sending output on the first port.

10. The method of claim 9, wherein the first port comprises a display port.

11. The method of claim 9, further comprising receiving the second KVM profile from a computer network.

12. A keyboard, video and mouse (KVM) device, comprising:
   memory comprising a plurality of KVM profiles, wherein the plurality of KVM profiles comprises:
      a first KVM profile having a first port setting as an input port; and
      a second KVM profile having the first port setting as an output port; and
   a processor coupled to the memory, wherein the processor is to:
      set the first port as an input based on the first KVM profile; and
      change the first port to an output based on the second KVM profile.

13. The KVM device of claim 12, wherein the first port comprises a display port.

14. The KVM device of claim 13, wherein the second KVM profile comprises a remote receiver profile.

15. The KVM device of claim 12, wherein the processor is further to receive a third KVM profile via a network interface and to store the third KVM profile in the memory.

\* \* \* \* \*